Dec. 28, 1926.
E. A. TAYLOR
1,612,233
PROCESS OF PRODUCING CALCIUM ARSENATE
Filed April 14, 1925
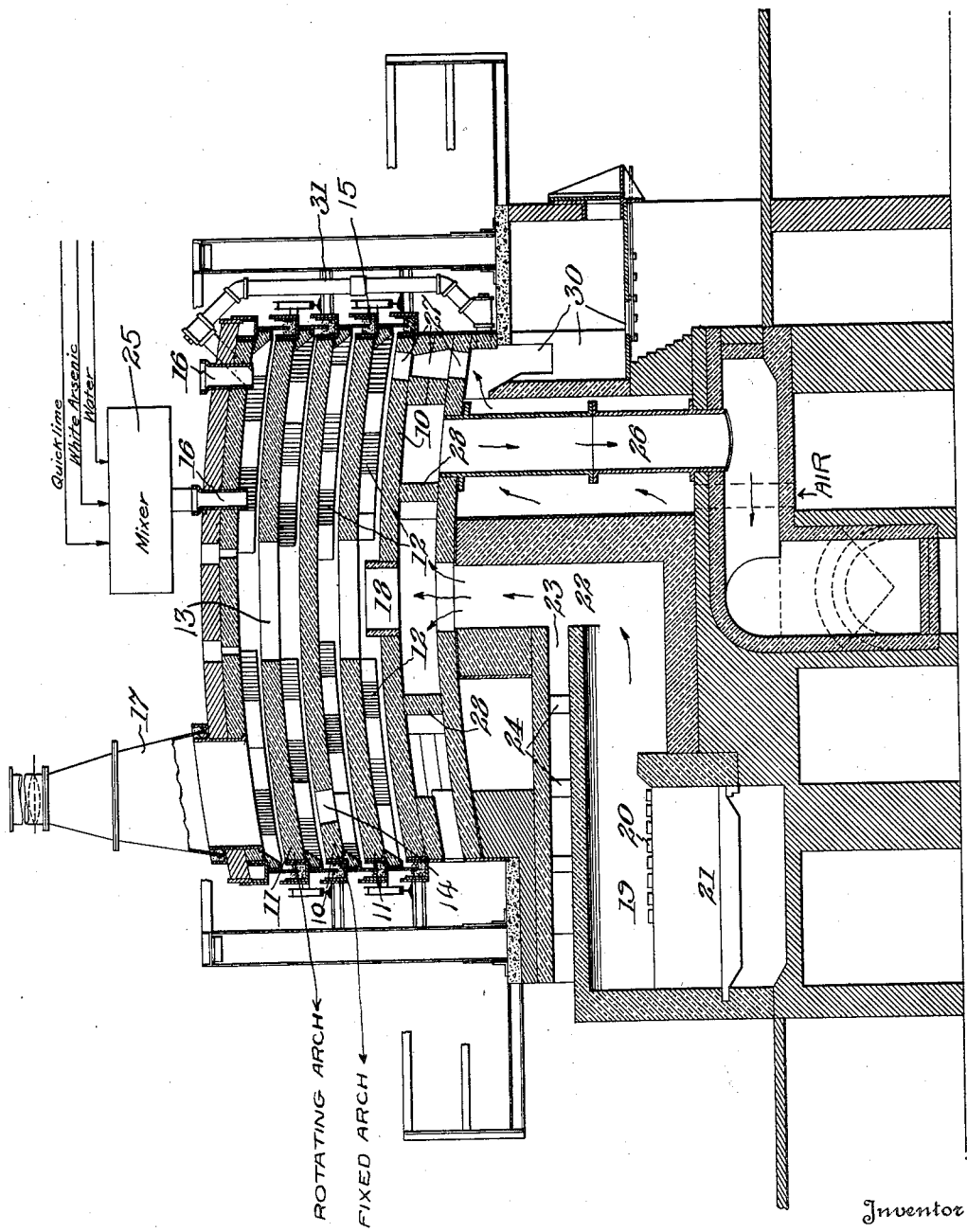
Inventor:
Edward A. Taylor,
By Byrne, Townsend & Brickenstein,
Attorneys.

Patented Dec. 28, 1926.

1,612,233

UNITED STATES PATENT OFFICE.

EDWARD A. TAYLOR, OF CLEVELAND, OHIO, ASSIGNOR TO THE GRASSELLI CHEMICAL COMPANY, OF CLEVELAND, OHIO, A CORPORATION OF OHIO.

PROCESS OF PRODUCING CALCIUM ARSENATE.

Application filed April 14, 1925. Serial No. 23,075.

This invention relates to a process of producing calcium arsenate from white arsenic and lime.

The invention has for its object the provision of a process which makes it possible to produce at a very low cost a product of standard quality.

Briefly expressed, the process consists in so utilizing the heat of reaction of the oxidizing operation as to make the process substantially self-sustaining.

For a full understanding of the invention and its advantages, reference is made to the accompanying drawing which is a vertical section through a preferred form of apparatus for carrying out the invention.

The apparatus, which is a modified de Spirlet furnace, see United States Patent No. 979,349, dated December 20, 1910, comprises a plurality of alternately fixed and movable platforms 10 and 11 respectively, of refractory material. The movable platforms 11 are supported for rotation about an imaginary vertical axis. Into the interior faces of the arches are built bricks 12 which serve the purpose to displace the material inwardly toward the central opening 13 or outwardly toward the openings 14, respectively.

The space between each pair of consecutive platforms defines a shelf of the furnace and is closed by a seal 15 of sand or other suitable material.

In the top platform, which serves as closure, are provided one or more inlets 16 through which the material to be treated is fed into the furnace, and a stack 17.

The bottom platform 10 has an opening 18 through which hot gaseous products of combustion enter the furnace. The hot gases may be obtained in any suitable manner as for instance by means of a combustion chamber 19 including a grate 20 and firebox 21. The combustion gases rise through a passage 22 to which leads an air passage 23 preferably containing baffles 24.

The operation is as follows:

The white arsenic and the lime are mixed with water. It was found that best results were obtained by limiting the amount of water for slaking and fixing of the lime and white arsenic to 30% or less, under which conditions the mixture remains a non-plastic loose mass which can be fed directly to the furnace without danger of balling or sticking. The mixing is carried out by a suitable powerful mechanical mixer 25 of the dough mixer type, into which the lime, the white arsenic and the water are separately fed at predetermined rates. Such drying as is necessary is accomplished on the top shelf on which the material falls as a loose mass.

The relative motion between the fixed and the rotary shelves maintains the mass in continuous agitation thereby permitting the fire gases and the air to uniformly act upon all particles.

The air which is preheated by thermal contact with parts of the furnace, as for instance a flue 26 through which part of the products of combustion is allowed to draw off at a controllable rate, is drawn into the furnace due to the injector action of the fire gases, through passage 27 and mingles with the hot fire gases. The air is thus in a condition to readily oxidize the arsenite to arsenate.

The oxidation reaction is exothermic. Inasmuch as the furnace is substantially all-ceramic, avoiding heat losses so far as it is practically possible, only a relatively small amount of heat need be introduced into the furnace to attain and maintain the required conditions of temperature for a continuous operation.

Below the bottom shelf is a gas space preferably provided with a number of baffles or deflectors 28. The fire gases are thus free to externally heat up the bottom hearth whereby the material on the bottom shelf is heated by contact with the shelf aside from direct contact with the fire gases. The same applies, of course, to all the other shelves which are heated by contact with the fire gases passing through the furnace. The material in passing downwardly from shelf to shelf is thus continuously acted upon on all sides by the sensible heat energy of the fire gases and is continuously agitated to expose all particles to the oxidizing action of the air.

The heat supplied to the furnace, the amount of air drawn through, the number of shelves and the rotary movement of the movable shelves may be so correlated as to produce a standard product at a minimum of cost.

The finished product is withdrawn from the furnace through a gate or damper controlled passage 30 which may include, as shown, the passage 27 through which the air is admitted.

A damper controlled by-pass 31 may be provided for directly admitting air to the top shelf or even to other shelves.

In fact there is considerable latitude in respect to various details. The feature of principal importance, so far as the apparatus is concerned, is the general construction of the furnace which makes it possible to conserve and fully utilize the heat of reaction.

The amount of heat conserved in the mass from the oxidation reaction has a twofold advantage. In the first instance, if the heat of reaction were allowed to more or less dissipate as was heretofore the case when the treatment was carried out in ordinary types of furnaces, as for instance the usual rotary furnace, an amount of heat would have to be introduced from the outside, which would be much larger than the amount of heat of reaction lost to the outside. For the heat of reaction already in the mass can be fully utilized while a larger amount would have to be introduced to produce effects equivalent to those that would have been produced by the heat that had originated in the mass but had left it, as is obvious. The amount of saving effected for the operation as a whole, by conserving the heat of reaction, is large out of proportion to the amount of the heat of reaction prevented from leaving the reaction mass.

The second and equally material advantage lies in the fact that the heat of reaction maintained in the mass and utilized for carrying out the heat reaction brings about more uniform heating conditions and leads to a more uniform product than can be obtained by old processes, aside from the fact that the duration of the operation is much shorter than with the processes of the prior art.

The apparatus described is particularly instrumental in carrying out the process of the present invention inasmuch as it is easy to maintain a uniformly heated mixture of excess air with fire gases which greatly assists in obtaining a uniform reaction and a uniform product.

I claim:

1. A process of producing calcium arsenate, which consists in subjecting a mixture of lime and white arsenic to the action of heat in the presence of an oxidizing medium and maintaining the reaction by conserving the heat of reaction of the oxidation of the arsenite to arsenate and supplying substantially only so much additional heat as is necessary to complete the reaction.

2. A continuous process of producing calcium arsenate, which consists in passing a mixture of lime and white arsenic through a heat zone in the presence of an oxidizing medium, continuously adding lime, white arsenic and the oxidizing medium and maintaining the reaction by conserving the heat of reaction of the oxidation of the arsenite to arsenate and continuously supplying only so much additional heat as is necessary to complete the reaction.

3. A process of producing calcium arsenate, which consists in mixing lime, white arsenic and water in such proportions as to produce a non-plastic loose mass, subjecting the mixture to the action of heat in the presence of an oxidizing medium and maintaining the reaction by conserving the heat of reaction of the oxidation of the arsenite to arsenate and supplying substantially only so much additional heat as is necessary to complete the reaction.

4. A continuous process of producing calcium arsenate, which consists in continuously mixing lime, white arsenic and water in such proportions as to produce a non-plastic loose mass, continuously passing the latter through a heat zone in the presence of an oxidizing medium and maintaining the reaction by conserving the heat of reaction of the oxidation of the arsenite to arsenate and continuously supplying only so much additional heat as is necessary to complete the reaction.

5. A continuous process of producing calcium arsenate, which consists in continuously mixing lime, white arsenic and water in such proportions as to produce a non-plastic loose mass, continuously passing the latter through a heat zone against a flow of hot oxidizing gas, and maintaining the reaction by conserving the heat of reaction of the oxidation of the arsenite to arsenate and supplying only so much additional heat to the heating zone as is necessary to complete the reaction.

6. A continuous process of producing calcium arsenate, which consists in continuously mixing lime, white arsenic and water in such proportions as to produce a non-plastic loose mass, continuously passing the latter through a heat zone against a flow of hot gaseous products of combustion and air, and maintaining the reaction by conserving the heat of reaction of the oxidation of the arsenite to arsenate and maintaining only such a flow of gaseous products of combustion as is necessary to complete the reaction.

In testimony whereof, I affix my signature.

EDWARD A. TAYLOR.